(12) United States Patent
Owen

(10) Patent No.: US 7,573,596 B2
(45) Date of Patent: Aug. 11, 2009

(54) SYSTEMS AND METHODS FOR FACILITATING USER ADJUSTMENT OF PRINT SETTINGS

(75) Inventor: James E. Owen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 845 days.

(21) Appl. No.: 11/122,604

(22) Filed: May 5, 2005

(65) Prior Publication Data

US 2006/0250628 A1 Nov. 9, 2006

(51) Int. Cl.
*G06F 15/00* (2006.01)
*G06F 17/00* (2006.01)

(52) U.S. Cl. ...................... 358/1.15; 715/248

(58) Field of Classification Search ............. 358/1.15, 358/1.12, 1.13, 1.14, 1.18, 447, 448, 518, 358/520, 527, 400, 1.9, 1.1; 715/202, 209, 715/234, 244, 247, 248, 276, 777; 707/3, 707/6, 100, 104, 200; 382/124, 181, 190, 382/305
See application file for complete search history.

(56) References Cited

U.S. PATENT DOCUMENTS

| 4,962,421 A | 10/1990 | Murai |
| 4,979,031 A | 12/1990 | Tsuboi et al. |
| 5,012,333 A | 4/1991 | Lee et al. |
| 5,208,903 A | 5/1993 | Curry |
| 5,377,013 A | 12/1994 | Oka et al. |
| 5,717,838 A * | 2/1998 | LeClair ................ 358/1.9 |
| 5,999,175 A | 12/1999 | Nalder |

FOREIGN PATENT DOCUMENTS

| EP | 1 311 113 | 5/2003 |
| JP | 2-110532 | 4/1990 |
| JP | 11-98374 | 4/1999 |

* cited by examiner

*Primary Examiner*—Saeid Ebrahimi Dehkordy
(74) *Attorney, Agent, or Firm*—Austin Rapp & Hardman

(57) ABSTRACT

In an exemplary method, a driver for a printing device receives a print job that comprises a document. The driver generates multiple samples that simulate the appearance of at least a portion of the document with different values for at least one print setting. The driver provides a visual presentation of the multiple samples on an output medium of an output device. The output device may be a display device, a printing device, etc. The driver juxtaposes the multiple samples on the output medium. When a user selects one of the multiple samples, the driver receives notification of the sample that was selected. In response, the driver configures the at least one print setting in accordance with the selected sample.

16 Claims, 9 Drawing Sheets

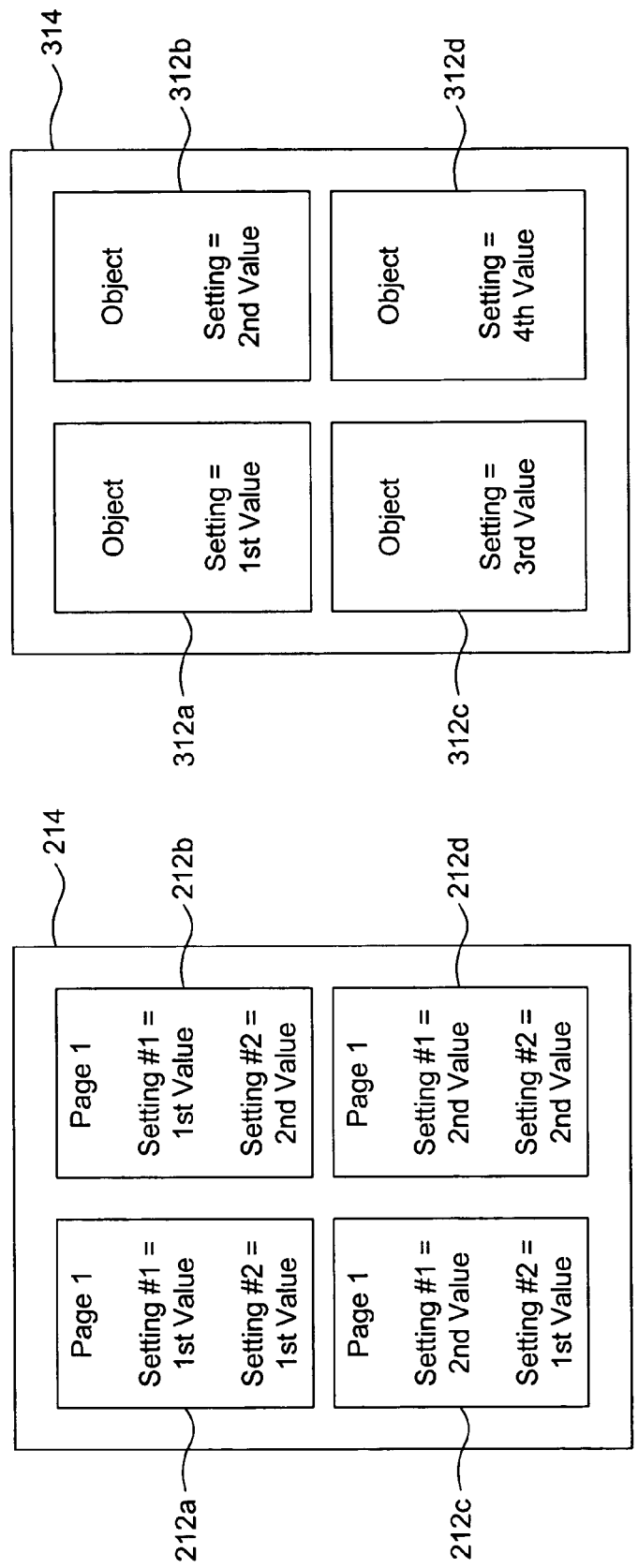

SYSTEMS AND METHODS FOR
FACILITATING USER ADJUSTMENT OF
PRINT SETTINGS

TECHNICAL FIELD

The present invention relates generally to printing use of a computer. More specifically, the present invention relates to systems and methods for facilitating user adjustment of print settings.

BACKGROUND

Computer technologies continue to advance at a rapid pace. Indeed, computers are used in almost all aspects of business, industry and academic endeavors. Improvements in computer technologies have been a force for bringing about great increases in business and industrial productivity. More and more homes are using computers as well.

There are many different kinds of computers in use today. The term "computing device" will be used herein to refer generally to any device that is capable of processing information to produce a desired result. Some examples of computing devices include personal computers, hand-held computers, personal digital assistants (PDAs), servers, mainframes, supercomputers, minicomputers, workstations, microcomputers, microcontrollers, and the like.

Application software is designed to use the capabilities of a computing device to help a user to perform various tasks. A piece of application software is sometimes referred to simply as an application. Examples of applications that are commonly used include word processors, Web browsers, database tools, graphics programs, and the like. Applications may be used to create electronic documents. Some examples of electronic documents include word-processed materials (e.g., letters, reports, etc.), spreadsheets, graphics, images, etc. Electronic documents are sometimes referred to simply as documents.

When printing a document, it is sometimes desirable to adjust the print settings that are used to print the document. A print setting is a variable that affects the appearance of at least some portion of a printed document. There are at least two different kinds of print settings, rendering print settings and non-rendering print settings. Some examples of rendering print settings include color (i.e., the amount of red, green, and blue), hue, saturation, intensity, brightness, contrast, etc. Some examples of non-rendering print settings include paper size, how many logical pages are printed on one physical page, whether both sides of the paper are used, etc.

Some print settings may be difficult for a computer user to adjust correctly. The user may not be familiar with the terminology that is used to describe some print settings. For example, some users may not be familiar with terminology such as saturation, hue, duplex, N-up, etc. Even if the user understands the terminology, it may be difficult for the user to visualize the effect of changing multiple print settings simultaneously. For example, it may be difficult to visualize the effect of changing the amount of red and changing the saturation simultaneously for a color document.

If the user is not able to easily adjust the print settings for a document, the user may resort to printing the document multiple times with different, randomly selected print settings. This is both frustrating and inefficient. The user may even give up on trying adjust the print setting(s), or on trying to print the document altogether.

In view of the foregoing, benefits may be realized by improved systems and methods for facilitating user adjustment of print settings. Some exemplary systems and methods for facilitating user adjustment of print settings are described herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 2 illustrates another set of samples that may be generated by a driver for a printing device;

FIG. 3 illustrates another set of samples that may be generated by a driver for a printing device;

DETAILED DESCRIPTION

Figure 1:
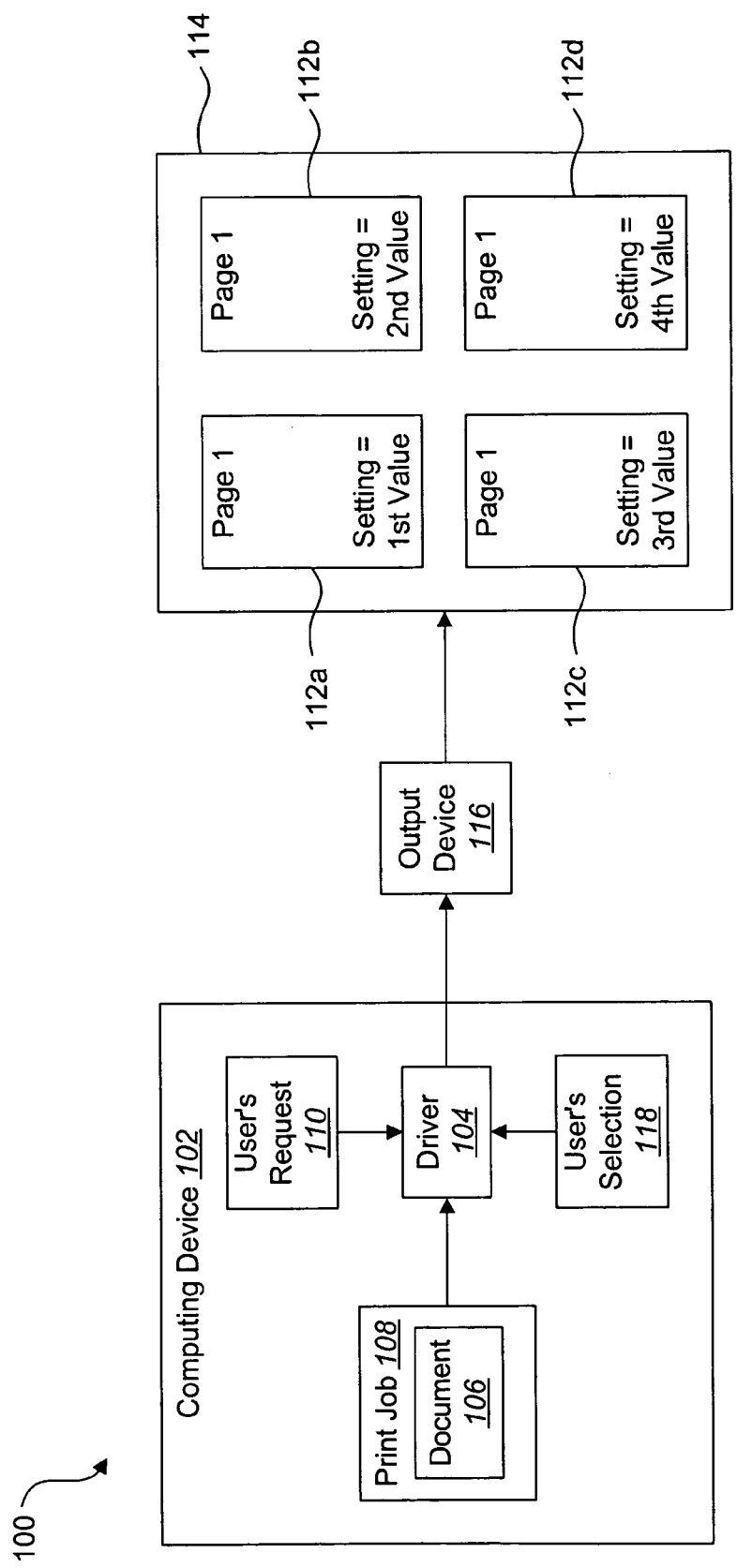
FIG. 1 illustrates an embodiment of a system for facilitating user adjustment of print settings, the system including multiple samples of a document that may be generated by a driver for a printing device.

A method for facilitating user adjustment of print settings is disclosed. The method involves receiving a print job that comprises a document. The method also involves generating multiple samples that simulate the appearance of at least a portion of the document with different values for at least one print setting. A visual presentation of the multiple samples is provided on an output medium of an output device. The output device may be a display device. Alternatively, the output device may be a printing device. The multiple samples are juxtaposed on the output medium. The method also involves receiving notification of a selected sample that was selected by a user. The at least one print setting is configured in accordance with the selected sample.

The multiple samples may simulate the appearance of a first page of the document, or a page of the document that is selected by the user. Alternatively, the multiple samples may simulate the appearance of multiple pages of the document. Alternatively still, the multiple samples may simulate the appearance of an object within the document. In some embodiments, each sample is smaller in size than the document.

The at least one print setting may be a rendering print setting. Alternatively, the at least one print setting may be a non-rendering print setting. The multiple samples may be generated in response to receiving a request from the user to adjust the at least one print setting. In some embodiments, the method also involves displaying a dialog box that comprises at least one control for selecting the portion of the document for which the multiple samples are generated.

In some embodiments, the step of generating the multiple samples may involve receiving printing instructions for the print job and writing the printing instructions to a journal file. To generate an Nth sample, the journal file may be read and at least some of the printing instructions from the journal file may be rendered, applying an Nth value or an Nth combination of values for the at least one print setting.

A method for facilitating user selection of a device profile for a display device is also disclosed. The method involves displaying a representation of color object data on a target display device. The method also involves providing multiple representations of the color object data on an output medium of a separate output device. The output device may be a display device. Alternatively, the output device may be a printing device. For each of the multiple representations, color management may be performed by combining a different device profile with a known device profile. The multiple representations are juxtaposed on the output medium. The method also involves receiving notification of a selected representation that was selected by the user, and associating the target display device with a device profile that corresponds to the selected representation.

A computer system that is configured to implement one or more of the methods described above is also disclosed. The computer system includes a processor, and memory in electronic communication with the processor. Instructions are stored in the memory. The instructions are executable to implement one or more of the methods described above. A computer-readable medium comprising executable instructions for implementing one or more of the methods described above is also disclosed.

Various embodiments of the invention are now described with reference to the Figures, where like reference numbers indicate identical or functionally similar elements. It will be readily understood that the embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Those skilled in the art will appreciate that many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, those skilled in the art will recognize that such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 illustrates an embodiment of a system 100 for facilitating user adjustment of print settings. A computing device 102 includes a driver 104 for a printing device (not shown). When a user of the computing device 102 initiates printing of a document 106, a print job 108 that includes the document 106 is provided to the driver 104.

The user makes a request 110 to adjust a print setting. The print setting may be a rendering print setting, such as color, hue, saturation, intensity, brightness, contrast, etc. Alternatively, the print setting may be a non-rendering print setting, such as paper size, how many logical pages are printed on one physical page, whether both sides of the paper are used, etc. The user's request 110 is provided to the driver 104.

In response to receiving the user's request 110, the driver 104 generates multiple samples 112 that simulate the appearance of at least a portion of the document 106 with different values for the specified print setting. In the illustrated embodiment, the driver 104 generates four samples 112 of page one of the document 106. A first sample 112a simulates the appearance of page one of the document with a first value for the specified print setting. A second sample 112b simulates the appearance of page one of the document with a second value for the specified print setting. A third sample 112c simulates the appearance of page one of the document with a third value for the specified print setting. A fourth sample 112d simulates the appearance of page one of the document with a fourth value for the specified print setting.

For example, suppose that the user wants to adjust the saturation of a color document. The first sample 112a may show page one of the document at a default saturation value, the second sample 112a may show page one of the document slightly under-saturated (i.e., with a value for the saturation that is slightly less than the default value), the third sample 112c may show page one of the document slightly over-saturated (i.e., with a value for the saturation that is slightly greater than the default value), the fourth sample 112d may show page one of the document fully saturated (i.e., with a maximum value for the saturation), and so forth.

Of course, the number of samples 112 shown in FIG. 1 is for illustrative purposes only. In alternative embodiments, the driver 104 may generate a different number of samples 112.

The driver 104 provides a visual presentation of the samples 112 on an output medium 114 of an output device 116. In some embodiments, the output device 116 may be a display device. In such embodiments, the driver 104 may display the samples 112 on the display device. Alternatively, the output device 116 may be a printing device. In such embodiments, the driver 104 may print the samples 112 on the printing device.

The size of the samples 112 on the output medium 114 may be smaller than the size of the document 106. For example, if the document 106 is formatted for printing on letter-sized (8½"×11") paper, each of the samples 112 may be smaller than 8½"×11".

The driver 104 juxtaposes the multiple samples 112 of the document 106 on the output medium 114. In other words, the driver 104 arranges the multiple samples 112 on the output medium 114 to facilitate side-by-side comparison or contrast. This gives the user an opportunity to compare the different samples 112 to see which one the user prefers.

When the user has selected a sample 112, the user's selection 118 is communicated to the driver 104. In response, the driver 104 configures the print setting in accordance with the selected sample 112. In other words, the driver 104 processes the print job 108 with the print setting at the value that corresponds to the selected sample 112. For instance, in the example described above, suppose that the user selected the sample 112 that was fully saturated, i.e., with the saturation being set at its maximum value. The driver 104 would then process the print job 108 with the saturation being set at its maximum value.

FIG. 2 illustrates another set of samples 212 that may be generated by a driver 104. As before, the samples 212 may be provided on an output medium 214 of an output device 116.

As before, the samples 212 simulate the appearance of a single page of a document 106 to be printed, namely page one. In the illustrated embodiment, however, the samples 212 include different combinations of values for multiple print settings. More specifically, a first sample 212a simulates the appearance of page one of the document with a first value for a first print setting and a first value for a second print setting. A second sample 212b simulates the appearance of page one of the document with the first value for the first print setting and a second value for the second print setting. A third sample 212c simulates the appearance of page one of the document with a second value for the first print setting and a second value for the second print setting. A fourth sample 212d simulates the appearance of page one of the document with the second value for the first print setting and the second value for the second print setting.

For example, suppose that the user requests that the following two print settings be adjusted: the number of logical pages that are printed on a single physical page, and the number of sides of the paper that are used. In this situation, the first sample 212a may simulate the appearance of physical page one of the document with one logical page per physical page and a single side of the paper being used. The second sample 212b may simulate the appearance of physical page one of the document with one logical page per physical page and both sides of the paper being used. The third sample 212c may simulate the appearance of physical page one of the document with two logical pages per physical page and a single side of the paper being used. The fourth sample 212d may simulate the appearance of physical page one of the document with two logical pages per physical page and both sides of the paper being used.

FIG. 3 illustrates another set of samples 312 that may be generated by a driver 104. As before, the samples 312 are provided on an output medium 314 of an output device 116. In the illustrated embodiment, the samples 312 simulate the appearance of an object within the document 106 with different values of a print setting. An object may be a graphic, an image, etc. An object does not necessarily occupy an entire page of the document 106, although it may.

A first sample 312a simulates the appearance of the object with a first value for a specified print setting. A second sample 312b simulates the appearance of the object with a second value for the specified print setting. A third sample 312c simulates the appearance of the object with a third value for the specified print setting. A fourth sample 312d simulates the appearance of the object with a fourth value for the specified print setting.

Figure 4:
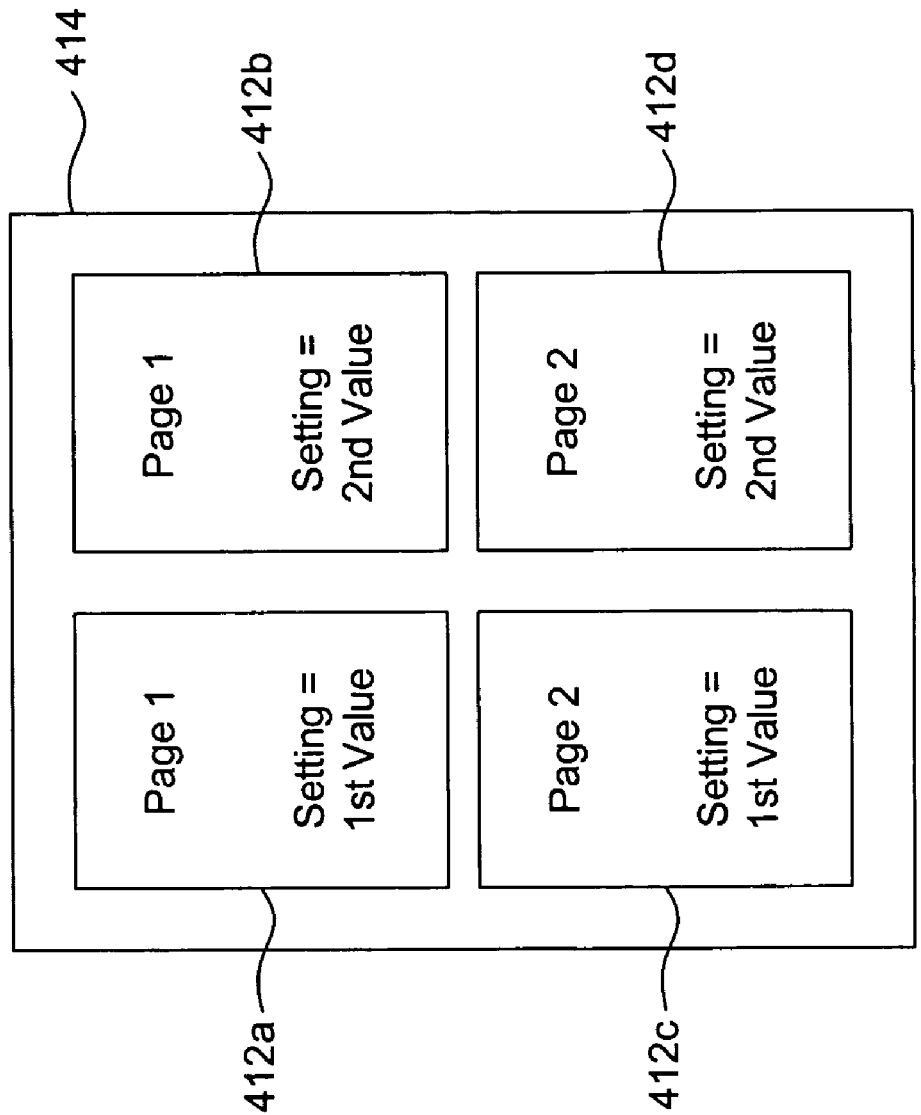
FIG. 4 illustrates another set of samples that may be generated by a driver for a printing device.

FIG. 4 illustrates another set of samples 412 that may be generated by a driver 104. As before, the samples 412 are provided on an output medium 414 of an output device 116. In the illustrated embodiment, the samples 412 simulate the appearance of multiple pages of a document 106 to be printed.

More specifically, a first sample 412a simulates the appearance of page one of the document with a first value for a specified print setting. A second sample 412b simulates the appearance of page one of the document 106 with a second value for the specified print setting. A third sample 412c simulates the appearance of page two of the document with the first value for the specified print setting. A fourth sample 412d simulates the appearance of page two of the document with the second value for the specified print setting.

The samples 412 that correspond to the same page of the document 106 are juxtaposed on the output medium 414. Thus, the samples 412a-b that correspond to page one of the document 106 are placed side-by-side, and the samples 412c-d that correspond to page two of the document 106 are also placed side-by-side.

Figure 5:
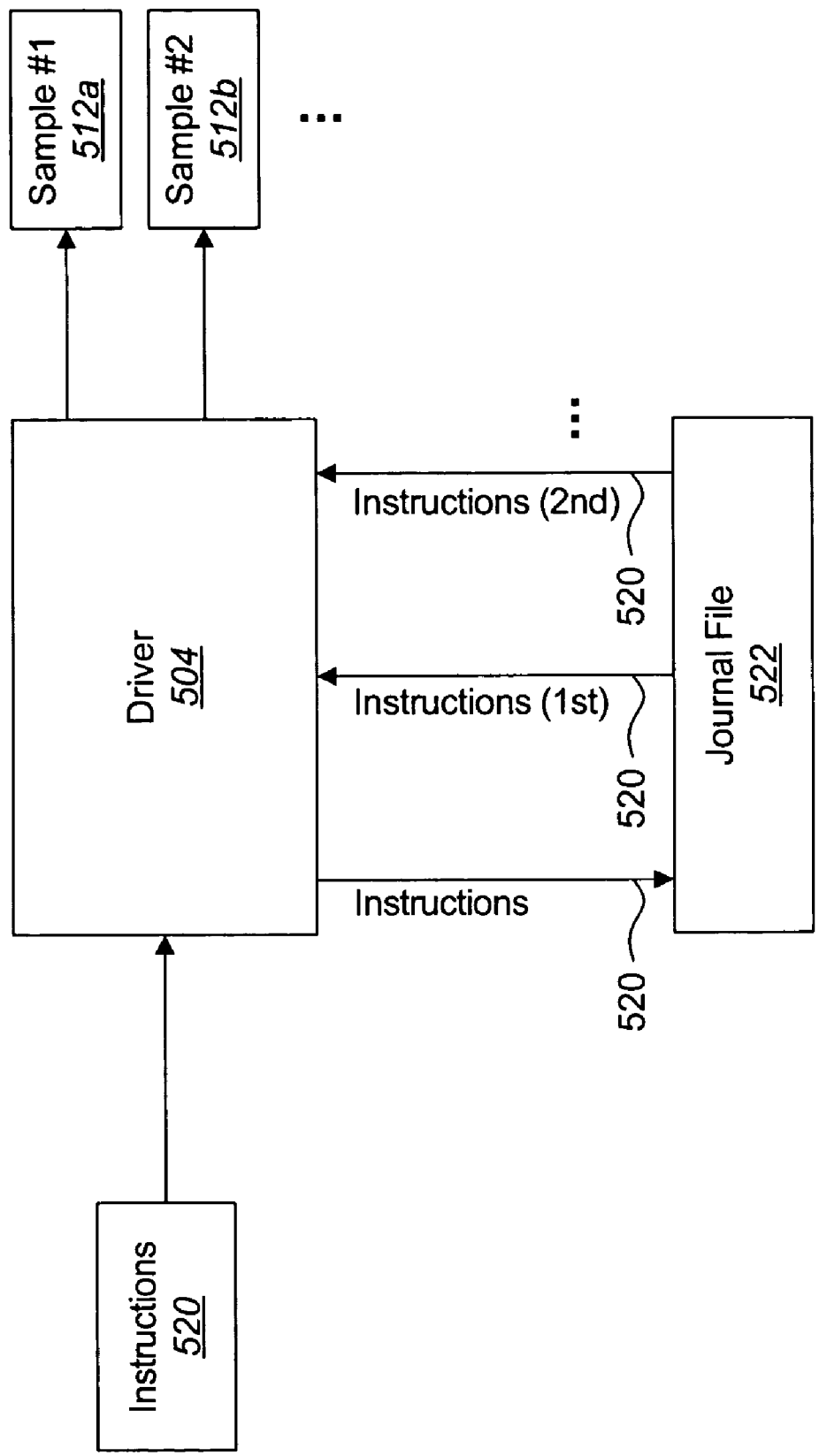
FIG. 5 illustrates an exemplary way that a driver may generate multiple samples of a portion of a document.

FIG. 5 illustrates an exemplary way that a driver 504 may generate multiple samples 512 of a portion of a document 106. The driver 504 receives instructions 520 for a print job 108 that comprises a document 106 to be printed. In some embodiments, the printing instructions 520 may be device driver interface ("DDI") calls.

The driver 504 writes the instructions 520 to a journal file 522. The driver 504 reads the journal file 522 once for each sample 512 that is generated. The driver 504 renders the instructions 520 that correspond to the portion of the document 106 that is to be sampled (e.g., a page, multiple pages, an object, etc.). When rendering the printing instructions 520 for the Nth sample, the driver 504 applies the Nth value of the print setting that is to be adjusted, or the Nth combination of print settings if multiple print settings are to be adjusted.

More specifically, to generate the first sample 512a, the driver 504 reads the journal file 522 for the first time. The driver 504 renders the journaled instructions 520 that correspond to the portion of the document 106 that is to be sampled. When rendering the instructions 520, the driver 504 applies a first value of the print setting to be adjusted, or a first combination of values if multiple print settings are to be adjusted.

To generate the second sample 512b, the driver 504 reads the journal file 522 for the second time. The driver 504 renders the journaled instructions 520 that correspond to the portion of the document 106 that is to be sampled. When rendering the instructions 520, the driver 504 applies a second value of the print setting to be adjusted, or a second combination of values if multiple print settings are to be adjusted. If more than two samples 512 are to be generated, the method described above in connection with the first and second samples 512a-b may be repeated for each additional sample.

Figure 6:
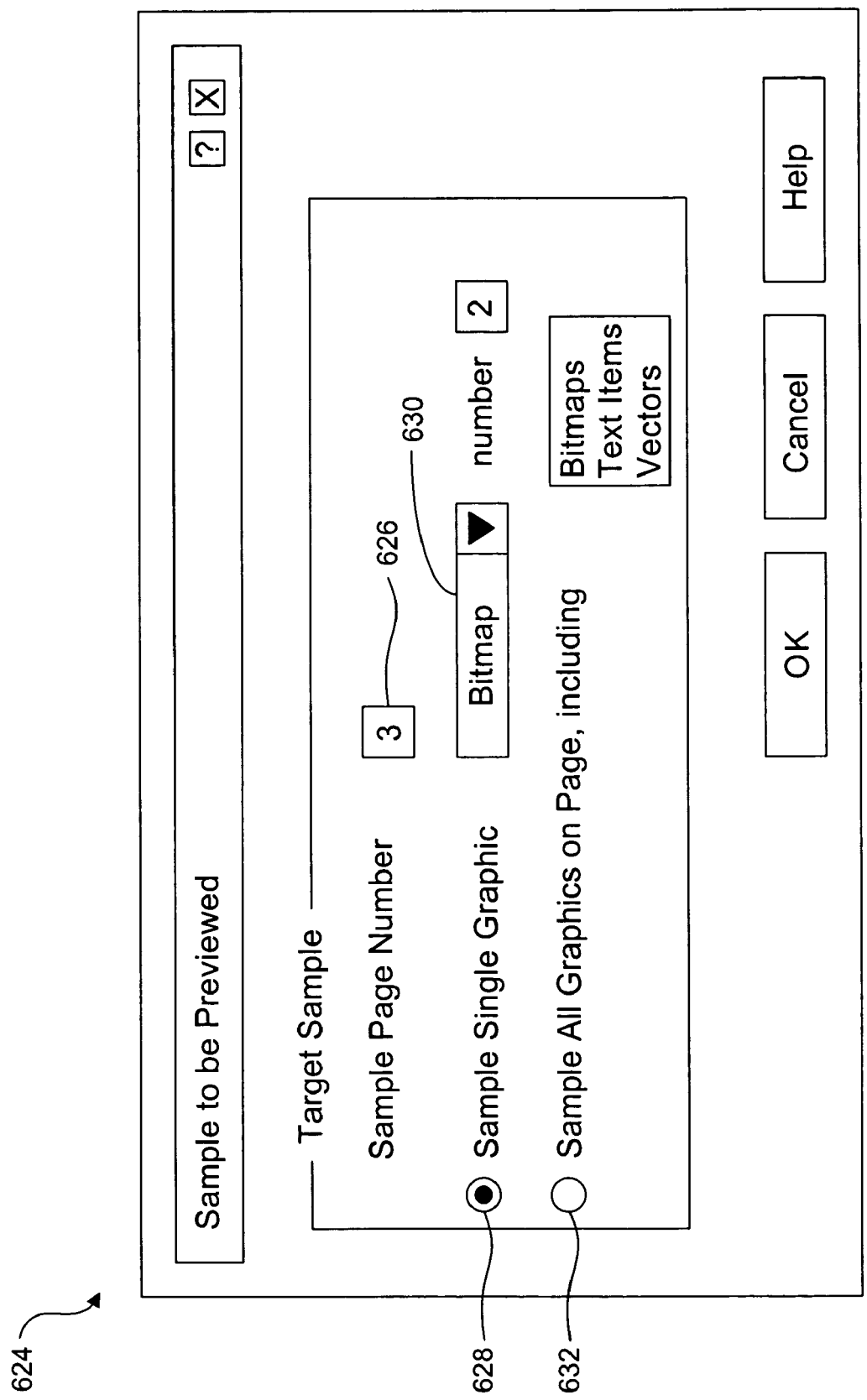
FIG. 6 illustrates an exemplary dialog box that may be displayed to a user.

FIG. 6 illustrates an exemplary dialog box 624 that may be displayed to a user. The dialog box 624 includes various controls for selecting the portion of a document 106 for which multiple samples 112 are generated.

In particular, the dialog box 624 includes a text box 626. The user may select a specific page of a document by entering the page number in the text box 626.

The dialog box 624 also includes a radio button 628 for selecting an option to sample a single graphic on the selected page. If this radio button 628 is selected, a drop-down menu 630 may be used to indicate the type of graphic that the user would like to see samples of. The dialog box 624 also includes a radio button 632 for selecting an option to sample all of the graphics on the selected page.

Figure 7:
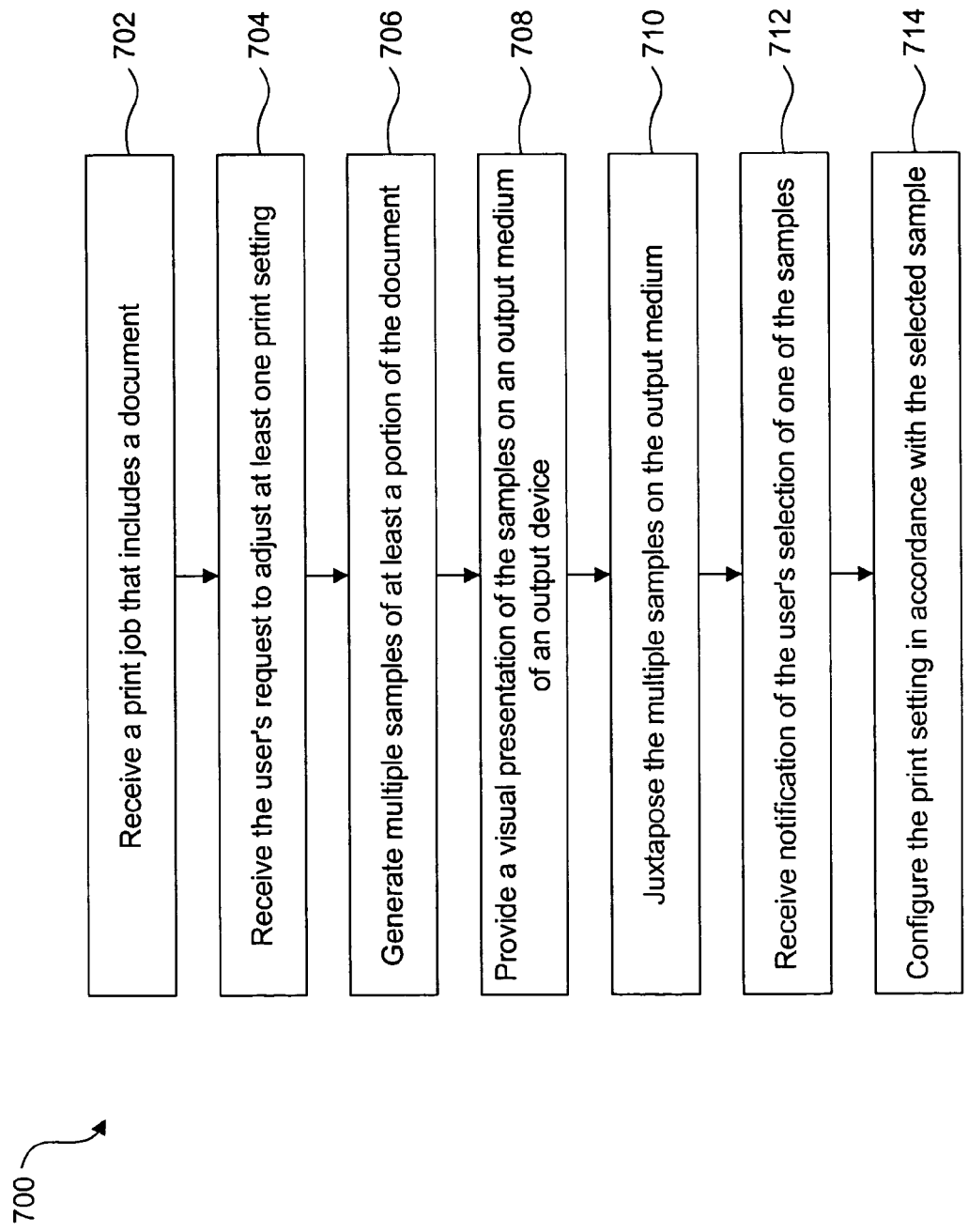
FIG. 7 illustrates an embodiment of a method for facilitating user adjustment of print settings.

FIG. 7 illustrates an embodiment of a method 700 for facilitating user adjustment of print settings. The method 700 may be performed by a driver 104 for a printing device.

When a user initiates printing of a document 106, the driver 104 receives 702 a print job 108 that includes the document 106. A user makes a request 110 to adjust at least one print setting, and the user's request 110 is received 704 by the driver 104.

The driver 104 generates 706 multiple samples 112 that simulate the appearance of at least a portion of the document 106 with different values for one or more print settings. For example, the driver 104 may generate multiple samples 112 simulating the appearance of a single page of the document 106, multiple pages of the document 106, an object within the document 106, etc. The samples 112 may simulate the appearance of the specified portion of the document 106 with different values of a single print setting, or of multiple print settings.

The driver 104 provides 708 a visual presentation of the samples 112 on an output medium 114 of an output device 116. The multiple samples 112 are juxtaposed 710 on the output medium 114. In other words, the driver 104 arranges the multiple samples 112 on the output medium 114 to facilitate side-by-side comparison or contrast. This gives the user an opportunity to compare the different samples 112 to see which one the user prefers.

When the user has selected one of the samples 112, the driver 104 receives 712 notification of the user's selection 118. In response, the driver 104 configures 714 the print setting in accordance with the selected sample 112.

Another context in which the techniques described above may be applied relates to color management. Color management is a set of technologies that seeks to ensure that a color object (e.g., an image, a graphic, a text object, etc.) is rendered as close as possible to its original intent on any device, despite differences in imaging technologies and color capabilities between devices.

Color models and color spaces are relevant concepts in the area of color management. A color model is an abstract mathematical model describing the way colors can be represented. An example of a color model is the red-green-blue (RGB) color model. A color space is a particular variant of a color model with a specific gamut (i.e., range) of colors. For example, Adobe RGB and sRGB are two different color spaces, both based on the RGB color model. Although both of these color spaces define color by the same three axes (R, G, and B), they differ in gamut as well as other specific characteristics.

A device profile is a file that contains information about how to convert colors in the color space and the color gamut of a specific device (such as a display device) into a device-independent color space, and vice versa. The International Color Consortium (ICC) has introduced a standard device profile format. Device profiles that conform to this standard format are often referred to as ICC device profiles, or simply ICC profiles.

Color management generally involves referencing the color behavior of the input and output devices that are being used to a known standard by means of device profiles. Accordingly, when performing color management, it is generally desirable to identify the appropriate device profiles for the input devices and output devices that are being used. Some examples of input devices include scanners, digital cameras, display devices (when used to create graphics, or to modify scanned images or digital pictures), etc. Some examples of output devices include display devices (when used for viewing pictures or scanned images), printing devices, etc.

Figure 8:
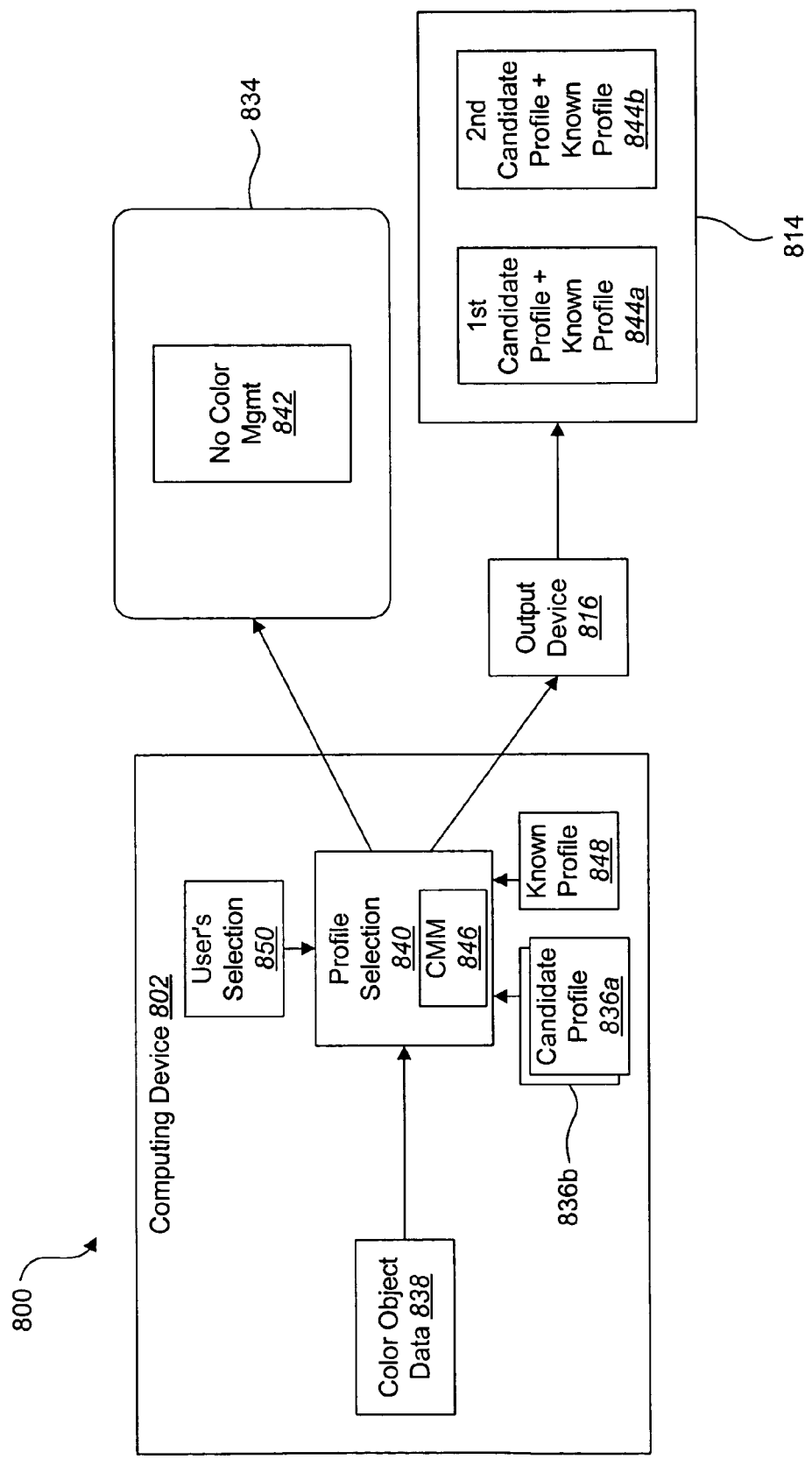
FIG. 8 illustrates an exemplary system for facilitating user selection of a device profile for a display device.

FIG. 8 illustrates an exemplary system 800 for facilitating user selection of a device profile for a display device 834, which may sometimes be referred to as a target display device 834. The system 800 facilitates the selection of a device profile for the target display device 834 from among multiple candidate device profiles 836. Two candidate profiles 836 are shown in the system 800 of FIG. 8, namely a first candidate profile 836a and a second candidate profile 836b. In alternative embodiments, more than two candidate profiles 836 may be provided.

A computing device 802 includes a profile selection component 840. The functionality of the profile selection component 840 may be implemented by an application, a driver, an operating system, etc. Color object data 838 (e.g., a color image, graphic, text object, etc.) is provided to the profile selection component 840. The profile selection component 840 displays a representation 842 of the color object data 838 on the target display device 834

In the illustrated embodiment, the profile selection component 840 displays the representation 842 of the color object data 838 on the target display device 834 without performing color management. In alternative embodiments, the profile selection component 840 may perform color management.

In addition to the representation 842 of the color object data 838 that is displayed on the target display device 834, the profile selection component 840 provides multiple representations 844 of the color object data 838 on an output medium 814 of a separate output device 816. In some embodiments, the output device 816 may be another display device. In such embodiments, the profile selection component 840 may display the multiple representations 844 of the color object data 838 on the display device. Alternatively, the output device 816 may be a printing device. In such embodiments, the profile selection component 840 may print the multiple representations 844 of the color object data 838 on the printing device.

A separate representation 844 of the color object data 838 is provided for each candidate profile 836. Thus, in the system 800 shown in FIG. 8, two representations 844 of the color object data 838 are provided, namely a first representation 844a and a second representation 844b.

The profile selection component 840 includes a color management module (CMM) 846. For each representation 844 that the profile selection component 840 provides on the output device 816, the CMM 846 performs color management.

Color management may involve combining device profiles into a transform that converts pixel data from an input color space (defined by an input device profile) to an output color space (defined by an output device profile). The transform is then applied to color object data.

To perform color management for a particular representation 844, the CMM 846 creates a transform by combining a candidate profile 836 and a known device profile 848, and then applies the transform to the color object data 838. In the illustrated embodiment, the known device profile 848 is a device profile for the output device 816. The candidate profile 836 is used as the input profile for the transform, and the known profile 848 is used as the output profile for the transform. More specifically, the CMM 846 performs color management for the first representation 844a of the color object data 838 by creating a first transform that converts the color object data 838 from the color space defined by the first candidate profile 836a into the color space defined by the known device profile 848. The CMM 846 applies the first transform to the color object data 838. The CMM 846 performs color management for the second representation 844b of the color object data 838 by creating a second transform that converts the color object data 838 from the color space defined by the second candidate profile 836b into the color space defined by the known device profile 848. The CMM 846 applies the second transform to the color object data 838. In alternative embodiments, a known device profile may be used as the input profile, and a candidate profile may be used as the output profile.

The profile selection component 840 juxtaposes the multiple representations 844 of the color object data 838 on the output medium 814. In other words, the profile selection component 840 arranges the multiple representations 844 on the output medium 814 to facilitate side-by-side comparison or contrast. This gives the user an opportunity to compare the different representations 844 to see which one the user prefers, i.e., to see which one best matches the representation 842 that is displayed on the target display device 834. When the user has selected a preferred representation 844, the user's selection 850 is communicated to the profile selection component 840. In response, the profile selection component 840 associates the target display device 834 with the candidate profile 836 that corresponds to the selected representation 844.

Figure 9:
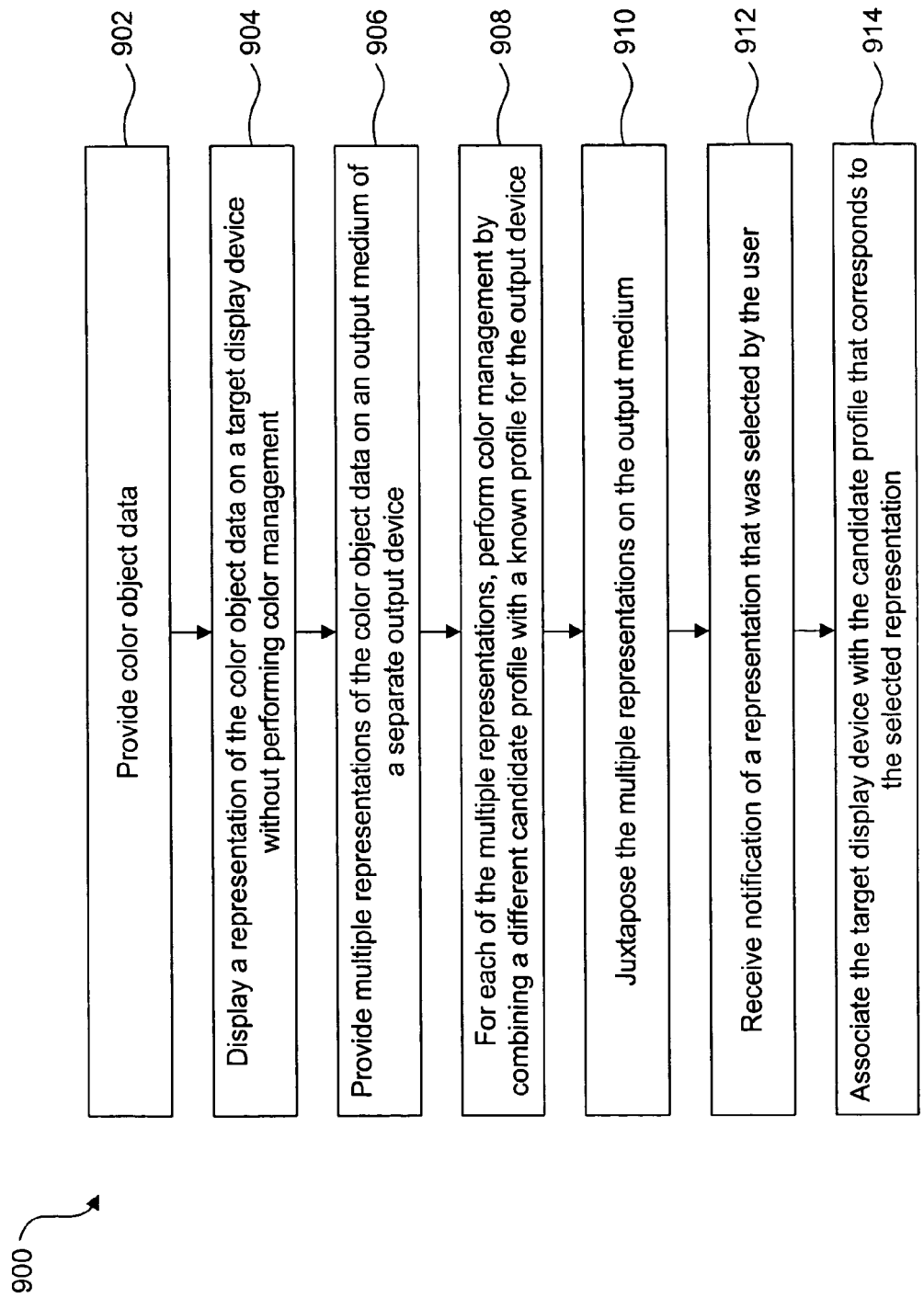
FIG. 9 illustrates an embodiment of a method for facilitating user selection of a device profile for a display device.

FIG. 9 illustrates an embodiment of a method 900 for facilitating user selection of a device profile for a display device 834. The method 900 may be performed by a profile selection component 840.

Color object data 838 is provided 902. The profile selection component 840 displays 904 a representation 842 of the color object data 838 on a target display device 834 without performing color management. In alternative embodiments, the profile selection component 840 may perform color management.

The profile selection component 840 also provides 906 multiple representations 844 of the color object data 838 on an output medium 814 of a separate output device 816. The output device 816 may be a display device, a printing device, etc. For each of the multiple representations 844, a color management module 846 performs 908 color management by combining a different candidate profile 836 with a known device profile 848 for the output device 816. More specifically, to perform color management for a particular representation 844, the CMM 846 creates a transform by combining a candidate profile 836 and the known device profile 848, and then applies the transform to the color object data 838. The candidate profile 836 is used as the input profile for the transform, and the known profile 848 is used as the output profile for the transform. In alternative embodiments, a known device profile may be used as the input profile, and a candidate profile may be used as the output profile.

The multiple representations 844 are juxtaposed 910 on the output medium 814. The user selects the representation 844 provided on the output medium 814 of the output device 816 that best matches the representation 842 that is displayed on the target display device 834. The profile selection component 840 receives 912 notification of the representation 844 that was selected by the user. In response, the profile selection component 840 associates 914 the target display device 834 with the candidate profile 836 that corresponds to the selected representation 844.

Figure 10:
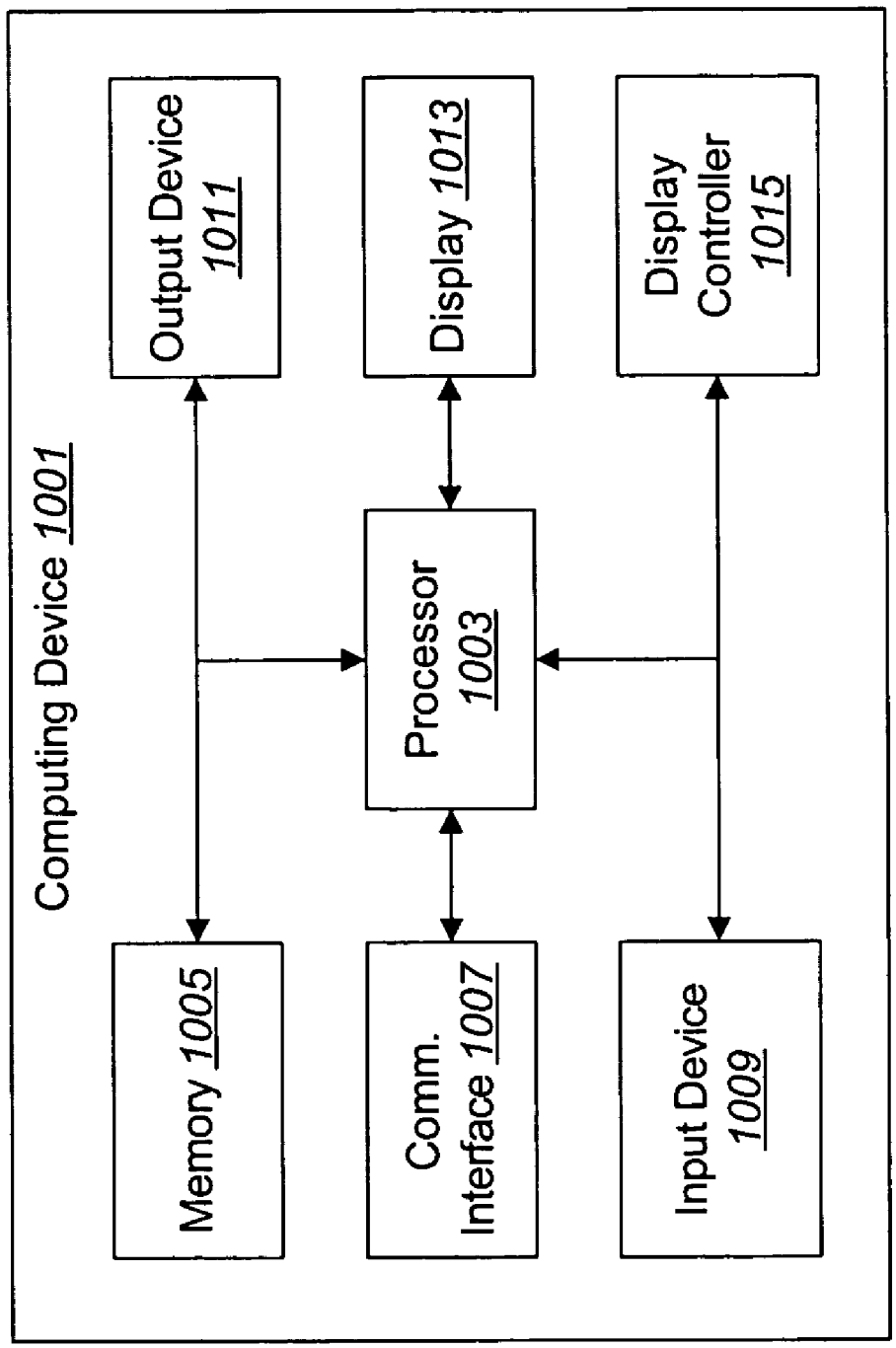
FIG. 10 is a block diagram illustrating the major hardware components typically utilized in a computing device.

FIG. 10 is a block diagram illustrating the major hardware components typically utilized in a computing device 1001. The illustrated components may be located within the same physical structure or in separate housings or structures.

The computing device 1001 includes a processor 1003 and memory 1005. The processor 1003 controls the operation of the computing device 1001 and may be embodied as a microprocessor, a microcontroller, a digital signal processor (DSP) or other device known in the art. The processor 1003 typically performs logical and arithmetic operations based on program instructions stored within the memory 1005.

As used herein, the term memory 1005 is broadly defined as any electronic component capable of storing electronic information, and may be embodied as read only memory (ROM), random access memory (RAM), magnetic disk storage media, optical storage media, flash memory devices in RAM, on-board memory included with the processor 1003, EPROM memory, EEPROM memory, registers, etc. The memory 1005 typically stores program instructions and other types of data. The program instructions may be executed by the processor 1003 to implement some or all of the methods disclosed herein.

The computing device 1001 typically also includes one or more communication interfaces 1007 for communicating with other electronic devices. The communication interfaces 1007 may be based on wired communication technology, wireless communication technology, or both. Examples of different types of communication interfaces 1007 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computing device 1001 typically also includes one or more input devices 1009 and one or more output devices 1011. Examples of different kinds of input devices 1009 include a keyboard, mouse, microphone, remote control device, button, joystick, trackball, touchpad, lightpen, etc. Examples of different kinds of output devices 1011 include a speaker, printer, etc. One specific type of output device which is typically included in a computer system is a display device 1013. Display devices 1013 used with embodiments disclosed herein may utilize any suitable image projection technology, such as a cathode ray tube (CRT), liquid crystal display (LCD), light-emitting diode (LED), gas plasma, electroluminescence, or the like. A display controller 1015 may also be provided, for converting data stored in the memory 1005 into text, graphics, and/or moving images (as appropriate) shown on the display device 1013.

Of course, FIG. 10 illustrates only one possible configuration of a computing device 1001. Those skilled in the art will recognize that various other architectures and components may be utilized.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. method for facilitating user adjustment of print settings, comprising:
   receiving a print job that comprises a document;
   generating multiple samples that simulate the appearance of at least a portion of the document with different values for at least one print setting, wherein generating the multiple samples comprises:
      receiving printing instructions for the print job;
      writing the printing instructions to a journal file; and
      to generate an Nth sample, reading the journal file, rendering at least some of the printing instructions from the journal file, and applying an Nth value or an Nth combination of values for the at least one print setting;
   providing a visual presentation of the multiple samples on an output medium of an output device;
   juxtaposing the multiple samples on the output medium;
   receiving notification of a selected sample that was selected by a user; and
   configuring the at least one print setting in accordance with the selected sample.

2. The method of claim 1, wherein the output device is a display device.

3. The method of claim 1, wherein the output device is a printing device.

4. The method of claim 1, wherein the at least one print setting comprises a rendering print setting.

5. The method of claim 1, wherein the at least one print setting comprises a non-rendering print setting.

6. The method of claim 1, wherein the at least one print setting comprises a single print setting.

7. The method of claim 1, wherein the at least one print setting comprises multiple print settings.

8. The method of claim 1, wherein each sample of the multiple samples is smaller in size than the document.

9. The method of claim 1, wherein the multiple samples simulate the appearance of a first page of the document.

10. The method of claim 1, wherein the multiple samples simulate the appearance of a page of the document that is selected by the user.

11. The method of claim 1, wherein the multiple samples simulate the appearance of multiple pages of the document.

12. The method of claim 1, wherein the multiple samples simulate the appearance of an object within the document.

13. The method of claim 1, further comprising receiving a request from the user to adjust the at least one print setting.

14. The method of claim 1, further comprising displaying a dialog box that comprises at least one control for selecting the portion of the document for which the multiple samples are generated.

15. A computer system that is configured for facilitating user adjustment of print settings, the computer system comprising:
   a processor;
   memory in electronic communication with the processor;
   instructions stored in the memory, the instructions being executable for:
      receiving a print job that comprises a document;
      generating multiple samples that simulate the appearance of at least a portion of the document with different values for at least one print setting, wherein generating the multiple samples comprises:
         receiving printing instructions for the print job;
         writing the printing instructions to a journal file; and
         to generate an Nth sample, reading the journal file, rendering at least some of the printing instructions from the journal file, and applying an Nth value or an Nth combination of values for the at least one print setting;
      providing a visual presentation of the multiple samples on an output medium of an output device;
      juxtaposing the multiple samples on the output medium;
      receiving notification of a preferred sample that was selected by a user; and
      establishing one or more values for the at least one print setting in accordance with the preferred sample.

16. A computer-readable medium comprising executable instructions for facilitating user adjustment of print settings, the instructions being executable for:
   receiving a print job that comprises a document;
   generating multiple samples that simulate the appearance of at least a portion of the document with different values for at least one print setting, wherein generating the multiple samples comprises:
      receiving printing instructions for the print job;
      writing the printing instructions to a journal file; and
      to generate an Nth sample, reading the journal file, rendering at least some of the printing instructions from the journal file, and applying an Nth value or an Nth combination of values for the at least one print setting;

providing a visual presentation of the multiple samples on an output medium of an output device;

juxtaposing the multiple samples on the output medium;

receiving notification of a preferred sample that was selected by a user; and establishing one or more values for the at least one print setting in accordance with the preferred sample.

* * * * *